F. C. BROWN.
APPARATUS FOR THE TREATMENT OF ORES AND FOR THE ELECTROLYTIC DEPOSITION OF GOLD AND SILVER AND OTHER METALS FROM SOLUTIONS CONTAINING SAID METALS.
APPLICATION FILED AUG. 5, 1907.

987,428.

Patented Mar. 21, 1911.

3 SHEETS—SHEET 2.

Witnesses:

Inventor
Frederick C. Brown
By James L. Norris
Atty

F. C. BROWN.
APPARATUS FOR THE TREATMENT OF ORES AND FOR THE ELECTROLYTIC DEPOSITION OF GOLD AND SILVER AND OTHER METALS FROM SOLUTIONS CONTAINING SAID METALS.
APPLICATION FILED AUG. 5, 1907.

987,428.

Patented Mar. 21, 1911.

UNITED STATES PATENT OFFICE.

FREDERICK CAPEL BROWN, OF KOMATA, NEW ZEALAND.

APPARATUS FOR THE TREATMENT OF ORES AND FOR THE ELECTROLYTIC DEPOSITION OF GOLD AND SILVER AND OTHER METALS FROM SOLUTIONS CONTAINING SAID METALS.

987,428.

Specification of Letters Patent.   Patented Mar. 21, 1911.

Application filed August 5, 1907.   Serial No. 387,162.

*To all whom it may concern:*

Be it known that I, FREDERICK CAPEL BROWN, a subject of His Majesty the King of the United Kingdom of Great Britain and Ireland, resident of Komata, in the Provincial District of Auckland and Colony of New Zealand, mine superintendent, have invented improvements in apparatus for the treatment of ores and for the electrolytic deposition of gold and silver and other metals from solutions containing said metals, of which the following is a specification.

This invention has reference to an improved apparatus for circulating, agitating and mixing crushed ore or the like in a liquid or semi-liquid state by compressed air or gas, and is specially applicable to such ores as require both amalgamation and subsequent treatment by a chemical process, such as the cyanid process, as during the agitation of the ore any free gold or silver can be amalgamated, and the gold and silver dissolved by the cyanid solution can be electrolytically deposited, and in a modified form of the apparatus the electrolytic deposition of metals from solutions can be carried out.

By means of this invention the treatment of a certain class of ores is simplified and cheapened.

My invention is illustrated in the accompanying seven drawings in which:—

Figure 1:
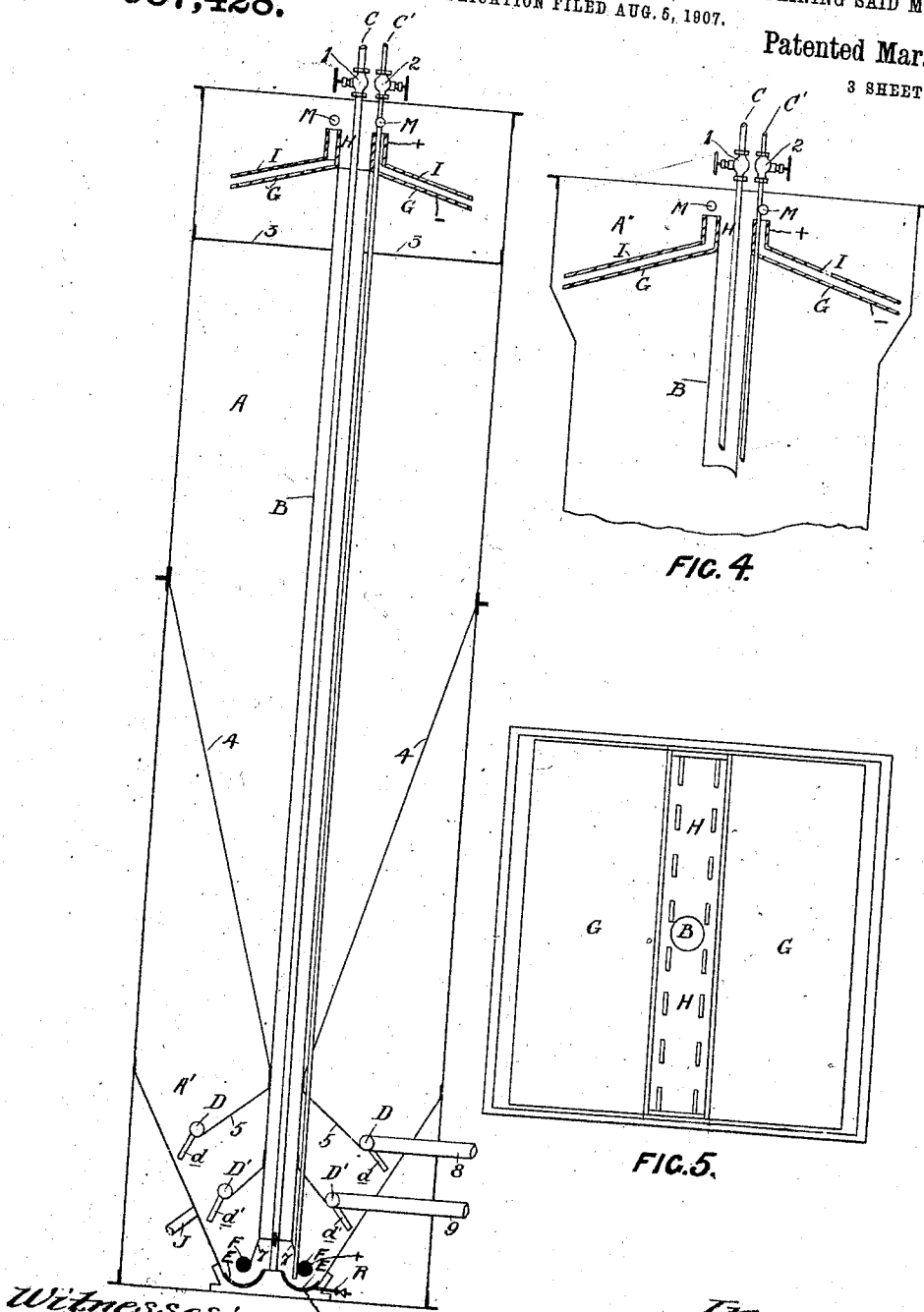
Figure 2:
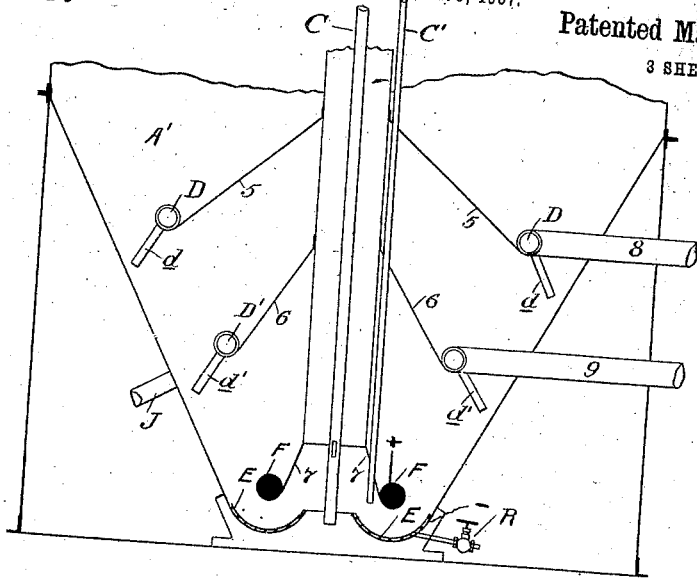
Figure 3:
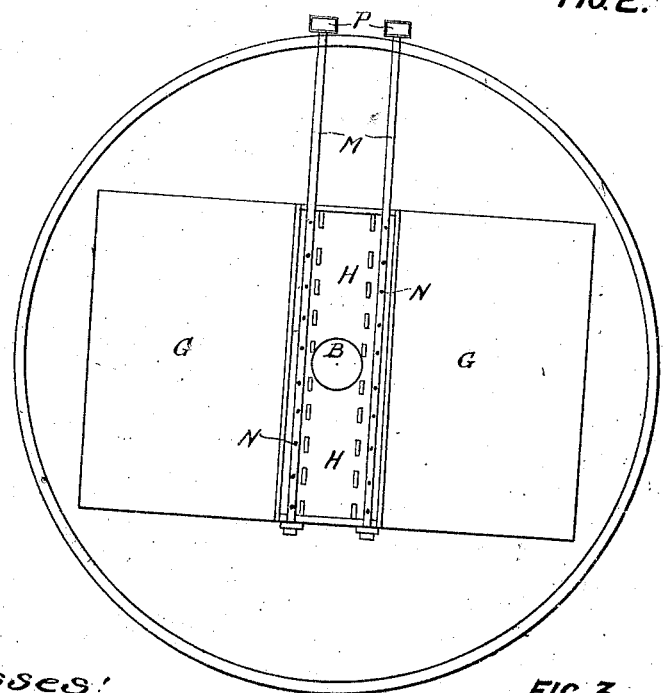
Figure 6:
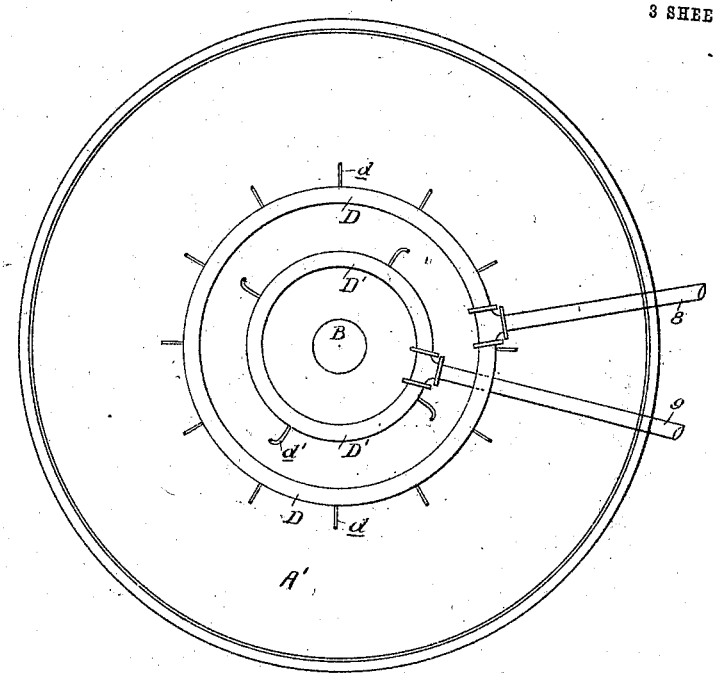
Figure 7:
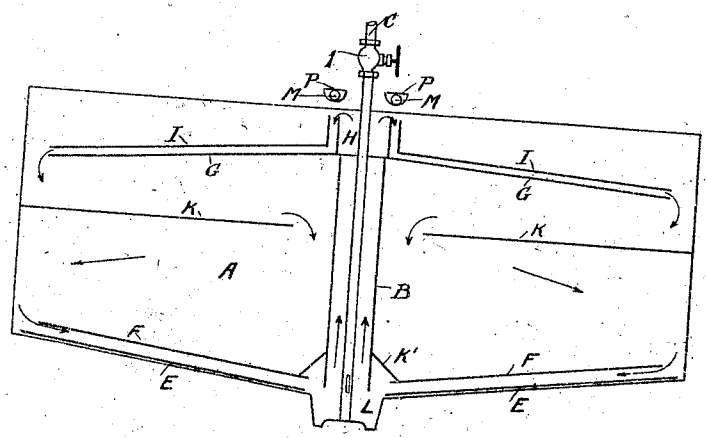

Figure 1 is an elevation of one form of the apparatus, Fig. 2 is a vertical section of the lower portion of the same drawn to an enlarged scale, Fig. 3 is a plan of the top of the apparatus showing distributing launder and top plates, Fig. 4 is a vertical section of the portion of a square topped tank, drawn to same scale as Fig. 1, Fig. 5 is a plan of the top of a square topped tank drawn to same scale as Fig. 4, Fig. 6 is a plan of the lower portion of the apparatus showing one arrangement of pipes in the cone, drawn to same scale as Fig. 2, and Fig. 7 is a sectional elevation of one form of the modified apparatus for treating solutions.

The apparatus is a tall cylindrical vertical tank or vessel A in which is centrally or otherwise mounted or held in position a material conducting pipe B, open at both ends and which extends upwardly from near the bottom of the tank to a point near the upper part of the tank. The tank has an inverted cone shaped bottom A' and a suitable means C connected to an air compressor or other air supply for admitting a supply of compressed air or gas into the lower end of the pipe B, and a suitable means C' for supplying compressed air or gas at the outside of the lower end of pipe B, and an arrangement of pipes D and D' provided with pipes or jets $d$ and $d'$ for delivering and distributing solution, water or air or a mixture of these from the pipes 8 and 9 into the conical bottom of the tank (see Fig. 6) so as to soften or loosen any material that may settle there, this operation being necessary at the starting of the agitation of sandy material, and also when discharging material after treatment. Electrodes are arranged at the bottom of the tank and also at the top of the pipe B. The cathode E at the bottom of the tank consists of a plate or plates or shallow basin made of copper or other suitable material, being separate from or part of the tank, amalgamated with or containing mercury: the anode or anodes F are made of iron, carbon, lead or other suitable material. Means are provided as hereafter shown for supplying mercury to and for drawing it off from the said plate or plates or basin E. The cathodes G at the top of the tank consist of one or more copper or other suitable plates arranged so that they slope downward from a distributing launder H, or other distributing device, into which the pipe B discharges, means being provided for distributing mercury over said plate or plates, any excess of mercury either passing to the cathode E at the bottom of the tank or being conducted away by a separate means: the anodes I are of iron carbon or other suitable material. The plate, plates or shallow basin E may be used for amalgamating the free gold and silver in the ore, either in conjunction with plates G, or by themselves. Plates G may also be used alone for amalgamating the free gold and silver in the ore. When it is advisable to have the plates or or electrodes G and I of large area the tank A is made with a square top A'' (Fig. 4).

J is a discharge pipe.

Fig. 7 shows a tank for treating metal-bearing solutions in which A is a round or rectangular tank with its bottom sloping downward toward the lower end of pipe or pipes B open at both ends and arranged centrally or otherwise within the tank. C is a means of admitting air into the bottom of pipe or pipes B. Electrodes are arranged at the bottom of the tank and also at the top of pipe or pipes B. These electrodes consist of copper or other suitable plates E and G and suitable anodes F and I. The pipe or pipes B discharge into a distributing launder H. K and K' are deflectors for distributing the flow of solution in the tank and are made of iron or other material. L is a well or trough at the bottom of the tank into which the solution flows before it is drawn up pipe or pipes B, and into which the mercury from the cathodes E and G gravitates, means being provided for drawing off this mercury and distributing it upon the cathodes E and G.

The method of using the apparatus is as follows:—The ore coming from the grinding or pulverizing machines is introduced into the tank A, usually at the top, or it may be pumped in at the bottom, and when necessary, it is allowed to settle so as to decant off any superfluous water or solution from the top. The agitation of the charge is now started by introducing solution, water or air, or a mixture of these into the conical bottom of the tank through pipe 9 into pipe D' which supplies pipes or jets d', and when the material in the tank has risen to within a short distance of the top of the pipe B, compressed air is admitted at the bottom of the pipe B through pipe C with the result that a mixture of sand and slime, solution or water and air rises through and is discharged from the top of pipe B. After a short time the supply of solution, water or air or the mixture of them is changed from pipe D' through pipe 8 into pipe D which supplies pipes or jets d, and these jets cause the body of sand or like material in the tank to settle down and in a short time the whole charge in the tank becomes a homogeneous mixture of solution and sand as it is drawn into the bottom of the pipe B and delivered at the top of the tank so rapidly that it has no chance to settle. As soon as the surface of the mixture in the tank has risen to the top of pipe B the solution or water is shut off from pipe D and the agitation of the mixture will go on as long as required by the agency of the compressed air being supplied through pipe C. In certain cases it is advisable to supply air through pipe C' so as to loosen any material packed on the outside of the bottom of pipe B, and this means of supplying air is also required in some cases to keep the agitation of the material going during the filling and the emptying of the tank. When it is required to treat the ore by amalgamation only, mercury is supplied to the plate, plates or basin E at the bottom of the tank, and as the ore in being drawn into the bottom of pipe B, continuously passes over this mercury, any free gold or silver is amalgamated. In some cases the amalgamation is performed by using plate or plates G, or both the amalgamating devices E and G may be used together. In order to precipitate the dissolved gold and silver electrolytically, a suitable current of electricity from a dynamo or other supply of electricity is supplied to the electrodes E and F, and G and I at the top and bottom of the tank, or in some cases only one set of electrodes is used with the result that a large percentage of the dissolved gold and silver is deposited at the cathodes E and G, or at E or G where only one set of electrodes is used. When the deposition of the gold and silver has proceeded as far as is desired, the supply of air is shut off and the charge in the tank is allowed to settle so as to decant off the clear solution, or if preferred, the whole charge, or the top portion of it, can be passed to a suitable filtering apparatus. The device for loosening or softening any settled material in the tank consisting of pipes D and D' and jets d and jets d' may in some cases be substituted by an interior vessel or chamber which has nozzles, pipes or apertures for the admission of liquid or air or a mixture of these to the conical part of the tank. The said interior vessel is connected with the common supply of liquid or air or both and may be used instead of or in addition to device D and D' and d and d'. The said interior vessel may be fitted to the tank in any appropriate manner and may be arranged to be raised and lowered or it may be made in one piece with the said tank. An exterior vessel with pipes or nozzles projecting through and into the conical part of the tank may also be used for the purpose specified.

The method of using the modified form of the apparatus for treating metal bearing solutions is on the same general lines as that described above for treating ores.

The novelty of the apparatus consists of the combination of arrangements by means of which a large quantity of either ground ore or "slimes" or other like material can be filled into the tank, allowed to settle so as to get rid of the superflous water or solution by decantation when required, and mixed with cyanid or other suitable solution and brought to a perfect state of agitation and while this agitation or circulation is going on the free gold and silver can be amalgamated and the other gold and silver contents of the ore can be dissolved and deposited on the cathodes in the form of amalgam by the agency of the electrodes charged with electricity as stated.

The mercury is fed into the tank or vessel A from the trough M which is mounted over the openings between the plates G and I so that on the trough M being slightly turned the mercury within it will pass through the perforations N and run down on to the plates G and fall from off them down into the inverted cone A' and into the cup E at the bottom thereof. The mercury is poured into the hoppers or openings P and runs therefrom into the trough M which is perforated at N as shown and marked.

The valve 1 regulates air supply C, the valve 2 regulates air supply C', the rods 3 and 4 support the pipe B, the rods 5 and 6 support the pipes D and D' respectively, the rod 7 supports the anodes F, and the pipes 8 and 9 supply the pipes D and D'.

These improvements are worked in connection with the apparatus described in the specification of U. S. Letters Patent, No. 791,872.

Having fully described my invention what I desire to claim and secure by Letters Patent is:—

1. In an apparatus of the class described, the combination of a vessel for the reception of ore pulp, a circulating pipe within said vessel and open at its opposite ends, a fluid supply pipe extending through said first mentioned pipe, a second fluid supply pipe disposed exteriorly of the first mentioned pipe, and an electro deposition device disposed in the path of the ore pulp circulating through said pipe.

2. In an apparatus of the class described, the combination of a vessel for the reception of ore pulp, a circulating pipe within said vessel and open at its opposite ends, a fluid supply pipe communicating with the interior of the circulating pipe at its lower end, means for supplying fluid under pressure outside the lower end of the circulating pipe and within the tank, means for agitating the sediment on the walls of the lower part of the vessel, and an electro deposition device disposed in the path of the ore pulp circulating through said circulating pipe.

3. In an apparatus of the class described, the combination of a vessel for the reception of ore pulp, a circulating pipe within the vessel and open at its opposite ends, a fluid supply pipe communicating with the circulating pipe, means for producing a preliminary agitation of the mixture in the vessel, two electro deposition devices in the vessel at superposed points and disposed in the path of the ore pulp circulating through said circulating pipe, and means for supplying an amalgamating substance to at least one of said electro deposition devices.

4. In an apparatus of the class described, the combination of a vessel having a conical bottom and adapted to receive the material to be treated, a conducting pipe arranged centrally therein and terminating at a point removed from the bottom thereof, means for circulating pulp through the pipe and into the vessel, and electro deposition devices in the vessel, disposed in proximity to the open ends of the pipe.

5. In an apparatus of the class described a tank having a conical base, a centrally situated circulating pipe open at both ends, the lower end being near the apex of the conical base and the upper end near the top of the tank, means for supplying a fluid lifting medium into the lower end of the aforesaid pipe, and precious metal extracting devices near the two ends of the pipe.

6. In an apparatus of the class described, a tall cylindrical tank having a conical base, a centrally situated circulating pipe open at both ends, the lower end being near the apex of the conical base and the upper end near the top of the tank, means for supplying a fluid lifting medium into the lower end of the aforesaid pipe, and electro-depositing devices near the two ends of the pipe.

7. In an apparatus of the class described, a tank having a conical base, a centrally situated circulating pipe open at both ends, the lower end being near the apex of the conical base and the upper end near the top of the tank, means for supplying a fluid lifting medium into the lower end of the aforesaid pipe, electro-depositing devices near the two ends of the pipe, and means for supplying mercury to the upper of the two electro-depositing devices.

8. In an apparatus of the class described, a tall tank having a conical base, a centrally situated circulating pipe open at both ends, the lower end being near the apex of the conical base and the upper end near the top of the tank, means for supplying a fluid lifting medium into the lower end of the aforesaid pipe, means for supplying a fluid medium outside the lower end of the said pipe, means for supplying a fluid medium to agitate the sediment that tends to collect on the wall of the conical base, and a precious metal extracting device near one end of the pipe.

9. In an apparatus of the class described, a tall cylindrical tank having a conical base, a centrally situated circulating pipe open at both ends, the lower end being near the apex of the conical base and the upper end near the top of the tank, means for supplying a fluid lifting medium into the lower end of the aforesaid pipe, means for supplying a fluid medium to agitate the sediment that tends to collect on the wall of the conical base, and precious metal extracting devices near the two ends of the pipe.

FREDERICK CAPEL BROWN.

Witnesses:
    GEORGE WILLIAM BASLEY,
    HILDA MAY FROUDE.